United States Patent [19]

Froeschke

[11] 4,279,579

[45] Jul. 21, 1981

[54] EXTRUSION APPARATUS

[75] Inventor: Reinhard Froeschke, Remshalden, Fed. Rep. of Germany

[73] Assignee: Sandvik Conveyor GmbH, Fellbach, Fed. Rep. of Germany

[21] Appl. No.: 97,750

[22] Filed: Nov. 27, 1979

[30] Foreign Application Priority Data

Dec. 8, 1978 [DE] Fed. Rep. of Germany ....... 2853054
Oct. 16, 1979 [DE] Fed. Rep. of Germany ....... 2941802

[51] Int. Cl.³ .............................................. B29F 3/01
[52] U.S. Cl. .......................................... 425/6; 264/8; 264/13; 264/142; 425/132; 425/217; 425/314; 425/376 B; 425/377; 425/447; 425/463; 425/464
[58] Field of Search ...................... 425/377, 6, 8, 142, 425/217, 294, 308, 314, 374, 331, DIG. 230, 382 R, 132, 462, 464, 447, 449, 463, 376 R, 376 B; 264/140-143, 118, 8, 13

[56] References Cited

U.S. PATENT DOCUMENTS

| 2,093,407 | 9/1937 | Baker | 264/118 |
|---|---|---|---|
| 2,340,501 | 2/1944 | Aasted | 425/DIG. 230 |
| 2,653,350 | 9/1953 | Piperoux | 425/DIG. 230 |
| 2,979,764 | 4/1961 | Andrew | 425/6 |
| 3,208,101 | 9/1965 | Kaiser et al. | 425/6 |
| 3,469,281 | 9/1969 | Payne | 425/464 |
| 3,973,890 | 8/1976 | Porter et al. | 425/311 |
| 4,029,459 | 6/1977 | Schmiedeke | 425/202 |
| 4,154,379 | 5/1979 | Schermutzki | 264/13 |

Primary Examiner—Jeffery R. Thurlow
Attorney, Agent, or Firm—Burns, Doane, Swecker & Mathis

[57]      ABSTRACT

Apparatus for the extrusion of a flowable mass onto a conveyor, comprises first and second cylindrical containers. The first container is disposed for rotation about a longitudinal axis and includes first passages for depositing the flowable mass. The second container includes a wall portion which contains a plurality of second passages. The wall portion is disposed against the first container, the latter rotating relative to the second container so that the first and second passages are periodically aligned to enable the flowable mass to be deposited onto the conveyor. The first and second containers define a gap therebetween which creates a negative pressure to suck-in excess mass from the outer periphery of the apparatus. A spatula is provided to push the mass into the gap.

10 Claims, 10 Drawing Figures

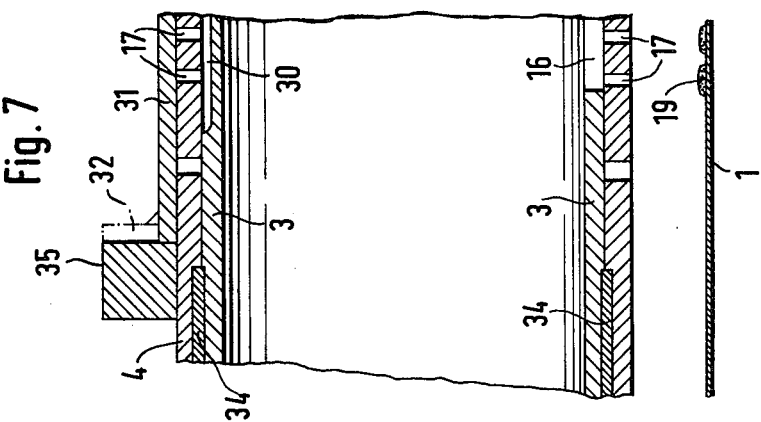
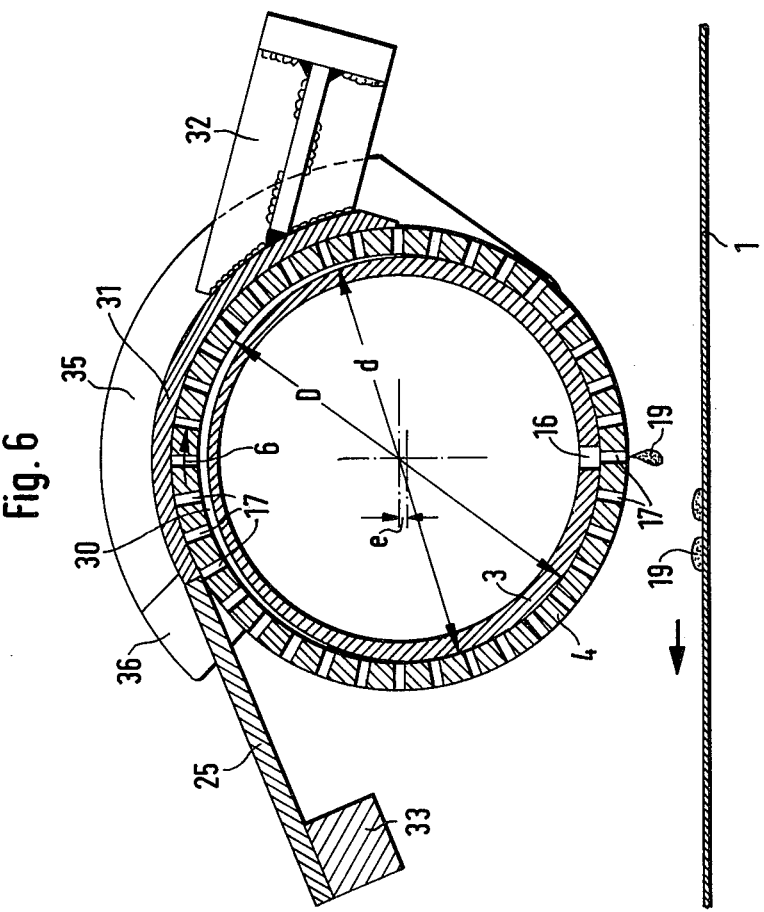

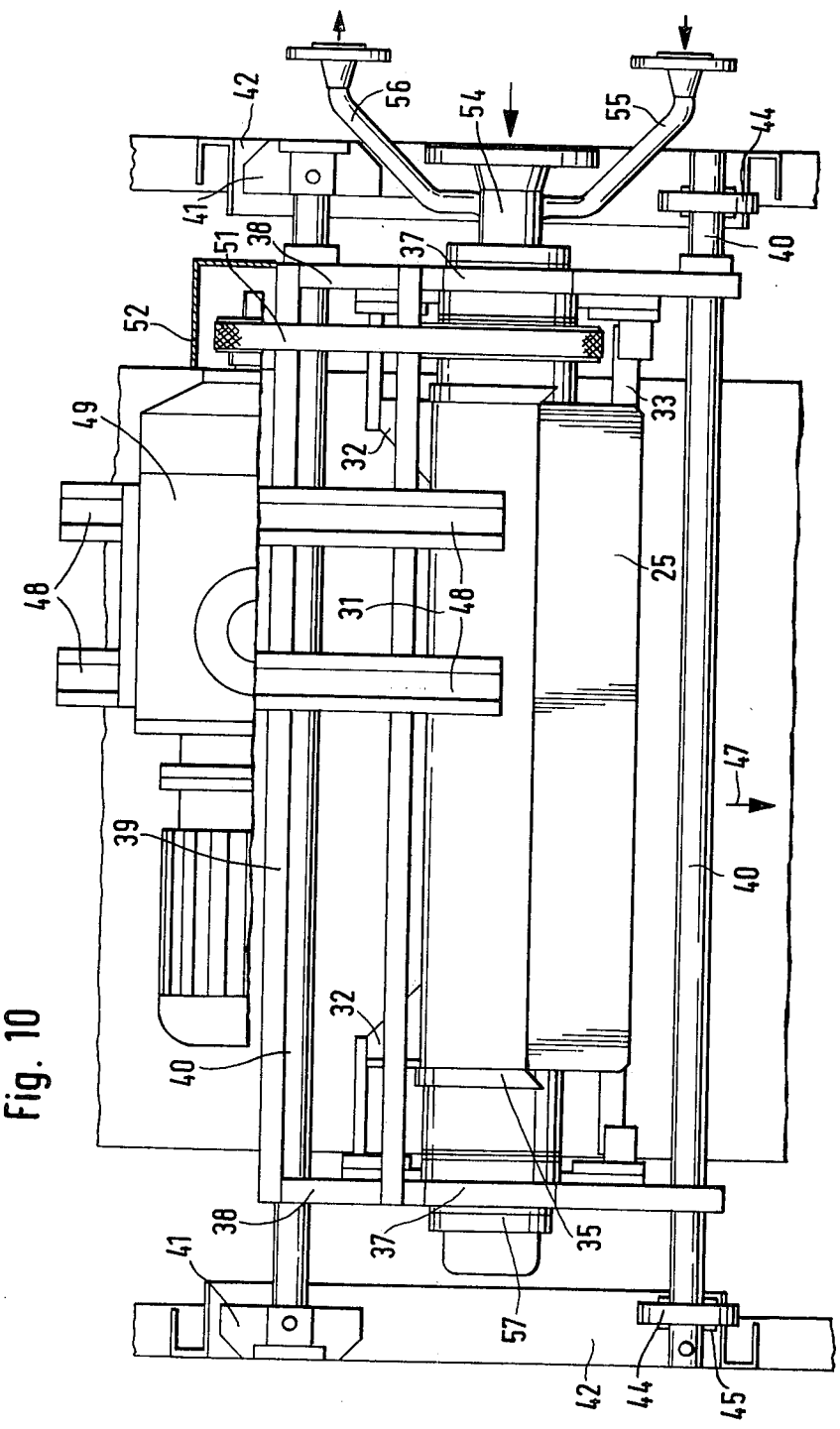

EXTRUSION APPARATUS

BACKGROUND AND OBJECTS OF THE INVENTION

The invention concerns an apparatus for the extrusion of flowable masses from a cylindrical, rotating container which is provided with peripherally distributed passages for the mass. The mass is fed axially into the container, which is located above a conveyor, cooling belt or the like, upon which the extruding mass will drop and then solidify or gelate. The extrusion is brought about by a rotation of additional cylindrical bodies relative to the container.

Apparatus for the extrusion of flowable masses are known. For example, the published German patent application No. 10 85 139 discloses a design for the forming of a granulate where a plunger reciprocates inside a cylinder, with the mass being extruded from a set of nozzles located within a front wall of the cylinder, either in strip or drop form. Systems of this type are suitable for the processing of synthetic powders; these known arrangements are also equipped with heating devices.

Published German patent application No. 26 35 147 discloses another design for the manufacture of solid particles where a membrane, reciprocating under the alternating pressure of a fluid, extrudes the flowable mass from a number of nozzles. This specific design has the advantage that there is no need to arrange and move mechanical parts close to the walls of the chamber which contains the mass to be processed so that wear and tear can be held to a minimum. However, designs of this type are not very suitable for the processing of materials which will not readily form drops.

There are further known arrangements of the type discussed above (e.g., published German patent applications No. 17 67 381 and No. 12 87 045) where there is provided a rotating drum which carries passages, distributed over its circumference, into which is fed laterally the material to be granulated. The material is subsequently extruded from two diametrically opposed sides of the rotating drum by means of rollers which are fixedly but rotatably arranged inside the drum, their outer contours being in contact with the inner wall of the rotating drum. The granulate is then produced by means of cutting knives which are located at the outer surface of the rotating drum and which separate the extruding material into sections of desired length. Systems of this type have the disadvantage that wear and tear will occur at the points of contact between the inside rollers and the inner diameter of the rotating drum. Another disadvantage is due to the fact that devices of this type cannot be used to form granulates from very fluid materials which will extrude under pressure from the passages in the form of drops because such drops would then form at and across the entire circumference of the rotating drum and produce a layer of material which adheres to its contour and either flow-off out of control or cause blockages.

It is the object of this invention to design an apparatus of the above-discussed type in such manner that materials which will not form drops readily, as well as very fluid materials, can be processed into a granulate in a simple manner and at a high degree of efficiency.

SUMMARY OF THE INVENTION

It is the essence of the invention that a second cylindrical container, its wall disposed rotatably at the wall of a first container, is provided with apertures which face the conveyor belt or the like and which periodically coincide with apertures of the first cylindrical container in the course of the relative rotation of the two containers. This specific design has the result that the wall sections of the outer container will, so to speak, function as a cutting device so that an apparatus for the extrusion and granulation of flowable masses can be built in a very simple manner. This novel design makes feasible the construction of an apparatus without the use and need of reciprocating components, such as plungers or pistons, thus making it possible to eliminate the friction and the resulting wear and tear of the rotating parts which does occur in the case of the known arrangements. It will be advantageous to arrange the apertures within the two cylindrical containers in rows running in parallel with the cylinder axes, with the cylinder axes arranged either perpendicularly or obliquely to the direction of motion by the conveyor belt. It is also feasible to arrange the outer cylindrical container in such manner that it will be stationary and to provide the same with a row of apertures which face the conveyor belt while the second cylinder, carrying a multitude of apertures, rotate inside.

However, it will be preferable and more advantageous to provide the inner container, designed in the form of a cylindrical drum, with a row of apertures or a slot facing the conveyor belt and to arrange the same in such manner that it will be stationary. The outer container is in the form of a cylindrical drum rotating about the stationary drum. The corresponding rows of apertures of the drums coincide successively, allowing the medium inside the drum which is under pressure and, preferably, heated, to extrude intermittently and in the form of drops onto the conveyor belt.

It will be especially advantageous in this case if the direction of rotation of the outer drum and its circumferential velocity are selected in such manner that the side of the outer drum facing the conveyor belt has a circumferential velocity component in direction of the conveyor movement, with this circumferential velocity component being equal to, or greater than the velocity of the conveyor movement; it was found that this specific arrangement results in a substantially greater production rate whenever drops are being formed. This is due to the fact that in the case of viscous masses, a drop extruding from the nozzle openings in direction of the conveyor belt, normally arrives at the conveyor belt before its end has emerged fully from the drip aperture. Since the conveyor belt is moving relative to the drip aperture, the end of the drop is dragged backwards in form of a thread to form undesirable extensions of the drop on the belt. In order to avoid such occurrence, it is necessary to select an appropriately lower belt speed to insure that the end of the drop falls onto the mass of the drop already located at the belt.

The previously mentioned specific design of the apparatus proposed by the invention where the end of the drip aperture, facing the conveyor belt, is being moved in the direction of the travel of the conveyor belt, assures even in the case of higher belt velocities that the end of the drop will not drag along the belt in thread fashion but will join the mass of the drop. This novel design will therefore permit the use of substantially higher belt velocities, and thus insure production at higher speeds. While the previously known drop-forming arrangements allow belt velocities of approximately 6 to 7 meters per minute, the novel arrangement according to the present invention permits belt velocities of 25 meters per minute when processing the same type of material.

In the case of the novel arrangement of the present invention, it is possible to equip the containers in an advantageous manner with a heating system which can be formed by heating tubes introduced into the inner chamber. However, it is also possible and advantageous to provide the inner container with double walls and to utilize the space formed between the walls as the heating area, for example by a flow of thermo-oil, steam or hot water through such area. This arrangement can be accomplished in a simple manner, namely by forming the two walls of the inner container by cylindrically curved metal plates, connected at their edges to a strip which is provided with apertures for the extrusion of the flowable mass. This specific design simplifies manufacture of the apparatus and circumvents difficulties which might arise if the extrusion apertures are located at a casing line.

The object of the invention can be further developed in an advantageous manner by providing a scraper for the removal of excess material, which has failed to drip from the outer wall of the container. The head of this scraper can point in standard manner in the direction counter to the direction of motion so that the scraped material is removed over and across the surface of the scraper, possibly for a recycling. In the case of a particularly advantageous arrangement, the scraper is designed in the form of a spatula, its head pointing in the direction of rotation of the outer container and fitting tightly to its perimeter, so that the spatula will force the excess material back into the apertures of the rotating outer container from where it can be subsequently deposited on the conveyor belt in the form of drops. It will also be expedient to provide at least some of the openings which are circumferentially staggered, with connecting collecting ducts to facilitate the removal of the material which is being forced back into the openings by the spatula. However, it will usually still be necessary to also utilize a scraper because it was found that the force-back arrangement alone will not sufficiently cleanse the outer surface of the rotating drum.

However, this has the disadvantage that the scraped-off material will usually be wasted or require relatively complicated devices for its return to the processing cycle. For this reason, and in further development of the invention, an apparatus of the above-defined type should be designed in such manner that the material which has failed to drop from the outer apertures will be held securely within the contour of the outer drum, thus eliminating any need for a scraping of this surface. This is accomplished by an arrangement of an eccentric gap within the region between the two containers which faces away from the conveyor or cooling belt. Due to this arrangement, a negative pressure is generated within the eccentric slot during the rotation which pulls back the material toward the inside or at least into the apertures. It was found that in the case of this specific arrangement there is no need for a scraping device because it is possible to keep the outer perimeter of the drum free of any adhering material. It will be advantageous to form the eccentric gap by a recess which is eccentrically arranged at the perimeter of the inner container and which has a diameter smaller than the inner diameter of the outer cylindrical container. This specific arrangement facilitates the joining and fitting together of the two cylindrical containers.

In the case of this specific arrangement it is also advantageous to place the spatula-type force-break device at the perimeter of the outer container within the region of the eccentric slot. It is further possible to provide a covering which fits tightly to the perimeter of the outer container, is aligned with the spatula that is in contact with this perimeter and spans the general sector where the two containers form the eccentric gap. This design has the advantage that the entire material which adheres to the outer surface will be forced back inwardly in the course of the rotation and pulled back toward the inside by the negative pressure generated below the covering. This covering prevents the outside air from entering the slot which could otherwise prevent or interfere with the built-up negative pressure. It will further be advantageous to surround the covering laterally by curved guiding webs which match the curvature of the outer container, their outer ends which face in direction of rotation of the outer container being provided with bevels that taper toward the region of the force-back device. This specific arrangement insures that the material left over from the drop-off process and adhering to the outer surface is funneled into the area between the force-back device and the outer drum from where it will be pulled back by means of the force-back device and the effect of the eccentric gap in the region within the perimeter of the outer drum.

The novel apparatus is distinguished by clean outer surfaces of the rotating drum, resulting in an unimpeded working cycle when drops are being formed within the lower region of the rotating drum.

THE DRAWING

The invention is illustrated by drawings which depict practical examples in diagram form, with the examples being explained below in detail.

FIG. 1 shows schematically and in perspective a novel apparatus for the extrusion of flowable masses onto a conveyor belt, FIG. 2 is a cross-sectional view of the two cylindrical drums depicted in FIG. 1, which rotate relative to each other, FIG. 3 shows the cylindrical drums of FIG. 2 in longitudinal cross-section, FIG. 4 shows in perspective and with a partial cut-away, another species of the novel extrusion apparatus where the inner cylinder has double walls, FIG. 5 illustrates schematically the dripping process of the novel apparatus, FIG. 6 shows schematically and in cross-section an extrusion apparatus with interlocking drums which are located above a conveyor belt, forming an eccentric gap between them, FIG. 7 shows the two drums of FIG. 6 in a partial longitudinal cross-section, FIG. 8 is a side elevational view of a modified arrangement of the cylindrical drums, with a portion thereof broken away to expose a drive mechanism.

FIG. 9 is a front view of the apparatus shown in FIG. 8 in the direction indicated by arrow IV, and FIG. 10 is a top view of the apparatus shown by FIGS. 8 and 9.

DETAILED DESCRIPTION OF A PREFERRED EMBODIMENT OF THE INVENTION

Figure 1:
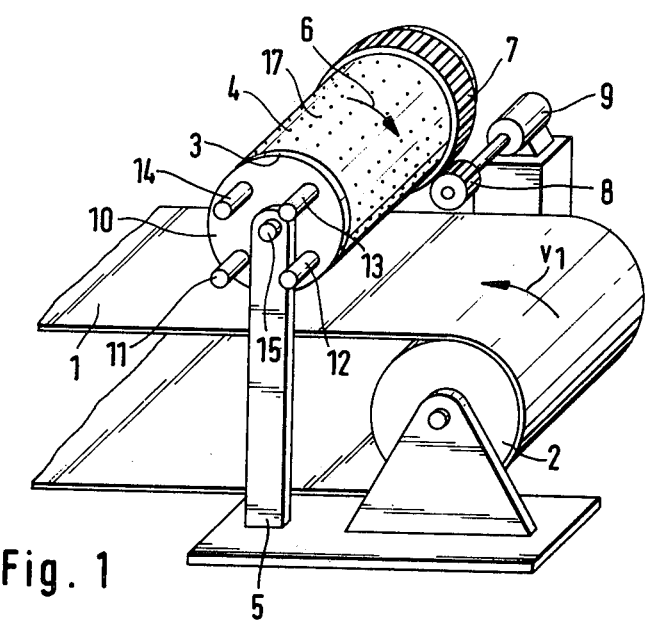

In FIG. 1 there is depicted a rotating conveyor belt, for example a steel belt 1, in the form of an endless belt which is guided by and over two rollers 2, with only one of these guiding rollers being illustrated. The steel belt 1 is provided with a drive (not illustrated) which moves the belt at a speed $v_1$. It is also possible to provide cooling devices, for example in the form of spray nozzles which are placed under the belt and which spray a cooling medium onto the lower surface of the belt, thus attaining a cooling by contact. Above the steel belt 1 there is located an apparatus which consists of two cylindrical drums 3 and 4, one placed inside the other and mounted rotatably relative to each other. The inner cylindrical drum 3 is fixedly mounted to supports 5, while the outer drum 4 revolves about the stationary drum 3 in the direction shown by arrow 6. The drum 4 is equipped for this purpose with a toothed rim 7 which is engaged by a pinion 8 of a fixedly mounted drive motor 9. However, it is also possible to drive the toothed rim 7 directly by means of a toothed wheel, connected with the drive of the steel belt 1.

The drums 3 and 4 are sealed from each other, and fittings 11 and 12 are provided in the front wall 10 of the stationary drum 3 for the supply of the material to be processed. Two heating tubes 13 and 14 enter the inside of the stationary drum 3, which can be equipped, as will be explained later on in detail, with electro-heated rods, or can be connected with each other and then serve as a fluid flow-through heating device for heating material which is present within the drum 3 and which is under pressure.

Figure 2:
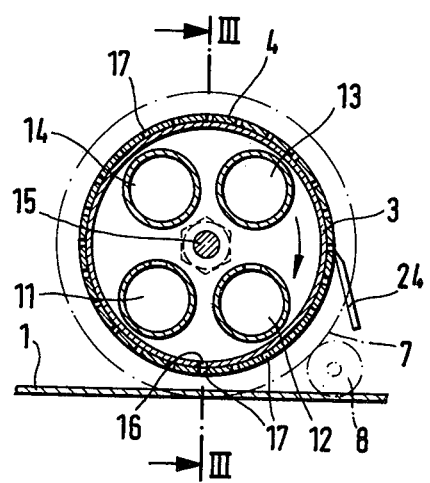
Figure 3:
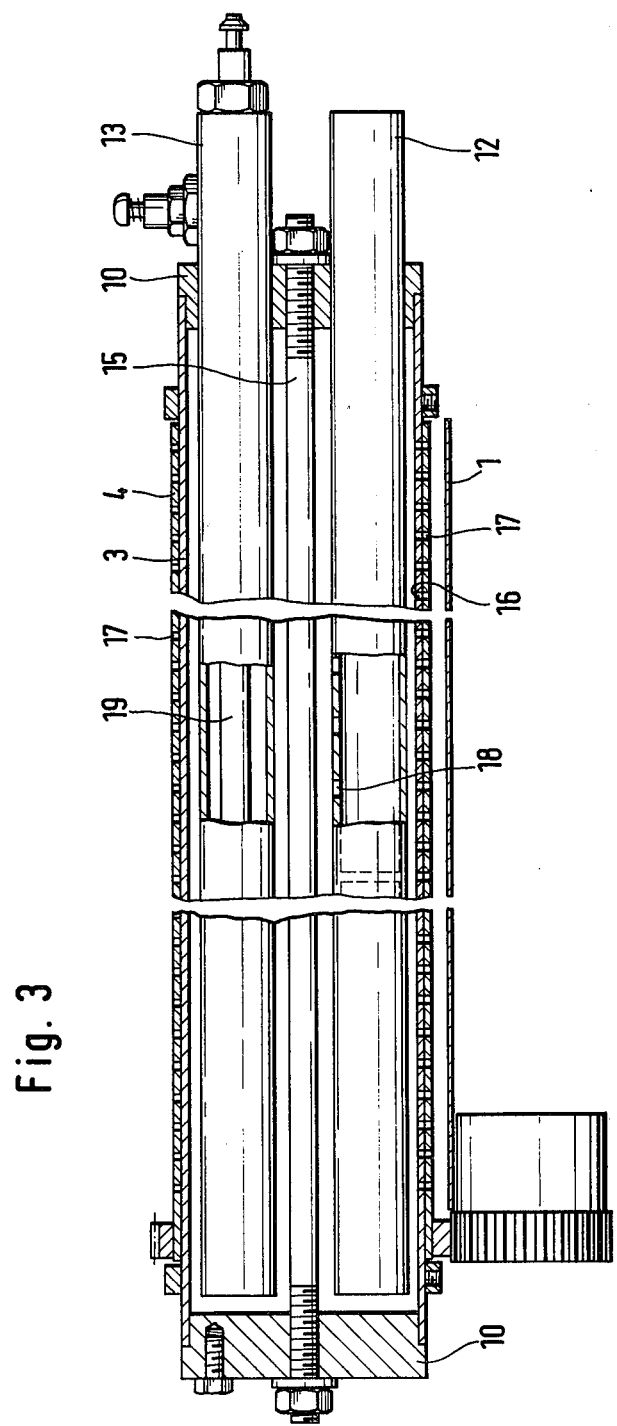

FIGS. 2 and 3 show that a span bolt 15 passes through the center of the inner drum 3, pulling two front walls 10 of the inner drum fixedly and sealingly toward each other as well as against the frontal edges of the inner drum. FIGS. 2 and 3 further show that the inner, stationary drum 3 is provided, at its lower side which faces the steel belt 1, with passages in the form of longitudinal slots or a longitudinal row of extrusion apertures 16. The outer rotating drum 4 is provided with several rows of passages 17 such as circular apertures or elongate slots for example, which are distributed over the entire perimeter of the drum and which are visible in FIG. 1. These passages 17 are placed along longitudinal lines of the outer drum 4 which extend parallel with the axis of the cylindrical drum, with the rows of passages being distributed uniformly over the perimeter of the drum 4.

The fittings 11 and 12 which protrude into the interior of the stationary drum 3 are, as is illustrated in fitting 12 in FIG. 3, provided with outlet apertures 18 through which the pressurized material to be processed can enter the inside space of the drum 3. The fittings 12 and 13 can, as illustrated in FIG. 3, extend throughout the entire length of the drum 3 but can also be of shorter length. It is also feasible to use one full-length fitting and one-half length fitting.

The two heating tubes 13 and 14 can be combined to form one U-shaped tube, with heating oil flowing through such tube. In the case of the example shown, the heating tubes are each equipped with electro-heat rods 19, inserted into tubes 13 and 14.

This novel apparatus makes it possible to extrude flowable, and possibly preheated, viscous masses under pressure through the apertures 16 of the fixed drum 3 and from there through the properly aligned apertures 17 of the rotary drum 4 from where they can drop onto the steel belt 1 which is passing under these apertures. It is feasible to dispense with such a rotation of the outer drum 4 so that the material to be processed will be delivered to the belt in the form of strips, but it is also possible to rotate the outer drum at a specific circumferential velocity relative to the stationary drum 3 so that various rows of apertures 17 will successively coincide with the row of apertures 16, with the apertures 16 closed-off during the interim. This makes it possible to allow the material being processed to fall onto the belt 1 in the form of drops and, for example, to granulate there. The drops which have arrived on the belt 1 can then be cooled in a known manner so that they will solidify and form solid particles.

Figure 5:
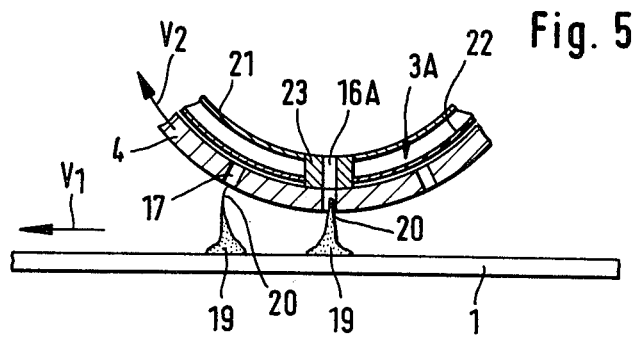

FIG. 5 demonstrates another advantageous feature of the novel arrangement, namely, that the circumferential velocity $v_2$ can be synchronized with the velt velocity $v_1$ thusly that it is greater than, or equal to, the belt velocity. If the direction of rotation of the drum 4 is selected so that the tangential velocity component of the drum 4 has the same direction as the velocity component of the belt 1, there is attained the advantage that the drops 19, or mainly their ends 20 which still adhere to the edges of the apertures 17, will not topple over backwardly as would otherwise be caused by the forward motion of the belt 1. There will thus not occur an undesirable formation of threads, a disadvantageous feature of the previously known arrangements, but rather the ends 20 will be carried along in the direction of motion of the belt by the drum 4 which is turning in the same direction, with the result that the ends, when finally separating from the edge of the apertures 17, will fall onto the center of the drops 19 located at the belt and merge with this drop, forming one entity due to their inherent heat. It becomes thus possible to increase substantially, depending on the selection of the drum diameter, the production rate of drop formers because it has been previously necessary in the case of known devices to set the belt velocity in accordance with the speed of the drop formation. Therefore, it had been necessary heretofore to keep the belt velocity sufficiently low to insure that the ends of viscous masses in their thread-like form would still be able to fall onto the core of the drop located on the belt.

Figure 4:
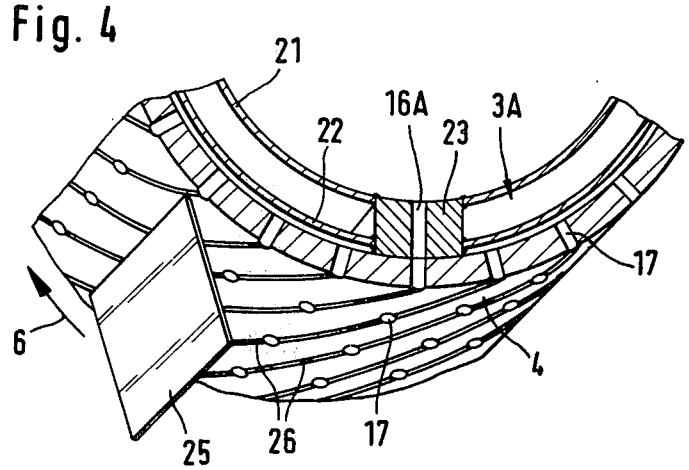

FIG. 4 illustrates another species of a novel drop-forming apparatus, dispensing with the aid of separate heating tubes 13, 14. For this purpose, the inner stationary drum 3A is constructed with double walls, as shown in FIG. 4, which comprise two concentrically arranged cylinders 21 and 22, formed by cylindrically curved sheet metals which are welded along their edges to a longitudinal strip 23. The width of the strip 23 corresponds to the spacing between the ends of each cylindrical wall 22, 21. This strip is provided with one longitudinal row of apertures 16A. The strip 23 is further provided at its outside with a cylindrical surface, the length of its diameter corresponding generally to that of the inner surface of the outer drum 4. The hollow area formed between the two cylindrical walls 22 and 21 can be charged with heating oil, steam or hot water for the heating of the material to be processed and present inside the drum 3. The design of the apparatus corresponds otherwise to the design of the apparatus illustrated in FIGS. 1 to 3. The outer drum 4 is mounted rotatably relative to the inner drum 3.

A scraper 24 can be arranged, as indicated in FIG. 2, for the removal of any material adhering to the perimeter of the outer drum 4, its edge directed in known manner in a direction counter to the direction of motion of the drum 4, to scrape off any material sticking to the perimeter of the drum 4 and making it available for recycling by moving the material across its surface. The embodiment according to FIG. 4 on the other hand utilizes a spatula 25, its end fitting snugly to the perimeter of the drum 4A and extending in the direction of motion as shown by arrow 6. This specific design makes it possible to force any material adhering to the perimeter of the drum 4 back into the apertures 17 of the drum 4, provided there is sufficient contact pressure exerted by the spatula 25, thereby eliminating the need for a separate recycling arrangement. In order to facilitate this action, there are arranged grooves 26 which extend in spiral form between apertures 17A where the individual apertures which are connected with each other are associated with different circumferential rows of apertures. The spatula 25 presses the excess material into these grooves 26, and the material can from there be forced back into the interconnected apertures 17 in a simple manner. When the particular row of apertures reaches the associated apertures 16 of the inner drum 3, the residual material so forced back can then be extruded together with the new substance onto the belt 1.

FIGS. 6 and 7 illustrate a steel belt 1 which can be designed in the form of a cooling belt or the like. Drops 19 of a flowable material, fed into the front end of the inner, stationary drum 3, fall onto this steel belt, solidify thereon and form a granulate. The drops 19 are formed as the outer drum 4 rotates about the inner drum 3, with the apertures 16 of the inner drum 3, facing the conveyor belt 1, eventually coinciding with the apertures 17 which are uniformly distributed over the perimeter of the outer drum 4. Accordingly, the flowable mass inside the drum 3, which is under positive pressure, drops downwardly through the aligned apertures 16, 17.

In order to eliminate the need to scrape off, and return for reprocessing, from the perimeter of the outer drum 4 any mass from the apertures 17 that has failed to drop off, there is provided, similar to the arrangement shown by FIG. 4, a spatula-shaped force-back device 25 which serves to push back into the apertures 17 the material protruding over the perimeter of the outer drum 4 while the outer drum rotates in the direction indicated by arrow 6. In order to improve significantly this push-back effect still further, the inner stationary drum 3, at its upper side opposite that containing the apertures 16, is provided with an outer diameter d which is smaller than the inner diameter D of the outer rotating drum 4. This diameter d of the inner drum is obtained by a machined recess at the perimeter of the drum 3, designed in such manner that its center point will be located eccentrically to the diameter D of the outer drum 4 by the amount e. In this manner, there is formed an eccentric gap 30 between the two drums 3 and 4. At the sides of supporting plates 38 (FIG. 9) there are fastened a covering 31 by means of brackets 32 as well as the force-back spatula 25 by means of a mounting rod 33. The cover 31 prevents air from entering the recesses 16, 17 and nullifying the negative pressure.

FIG. 7 shows that beyond the region of the eccentric gap 30 the outer diameter of the inner drum 3 fits closely within the inner diameter of the outer drum 4, with both drums mounted and held together by journal bearings 34. At the two ends of the covering 31 there are arranged curved guiding webs 35 which match the outer contour of the drum 4. The outer ends of the webs 35, facing in direction of rotation 6, are provided with surfaces 36 which are inclined longitudinally inwardly to insure that the material adhering to the outer surface of the drum 4 reaches the region underneath the forceback device 25 so that it can be pushed back from there into the apertures 17. Due to the arrangement of the eccentric gap 30 there is generated by the rotation of the drums 3 and 4 relative to each other a certain negative pressure inside the gap 30 which facilitates the removal of the material into the apertures 17. Within the region located at the trailing edge of the covering, viewed in the direction of rotation 6, the perimeter of the outer drum 4 will therefore be free of material and clean, ready for a repeat of the extrusion process when the apertures 16 are reached. The use of a scraper within the region in back of the covering 31 (viewed in direction of rotation), denoted by numeral 24 in the case of the species illustrated by FIG. 2, could be superfluous here.

Figure 8:
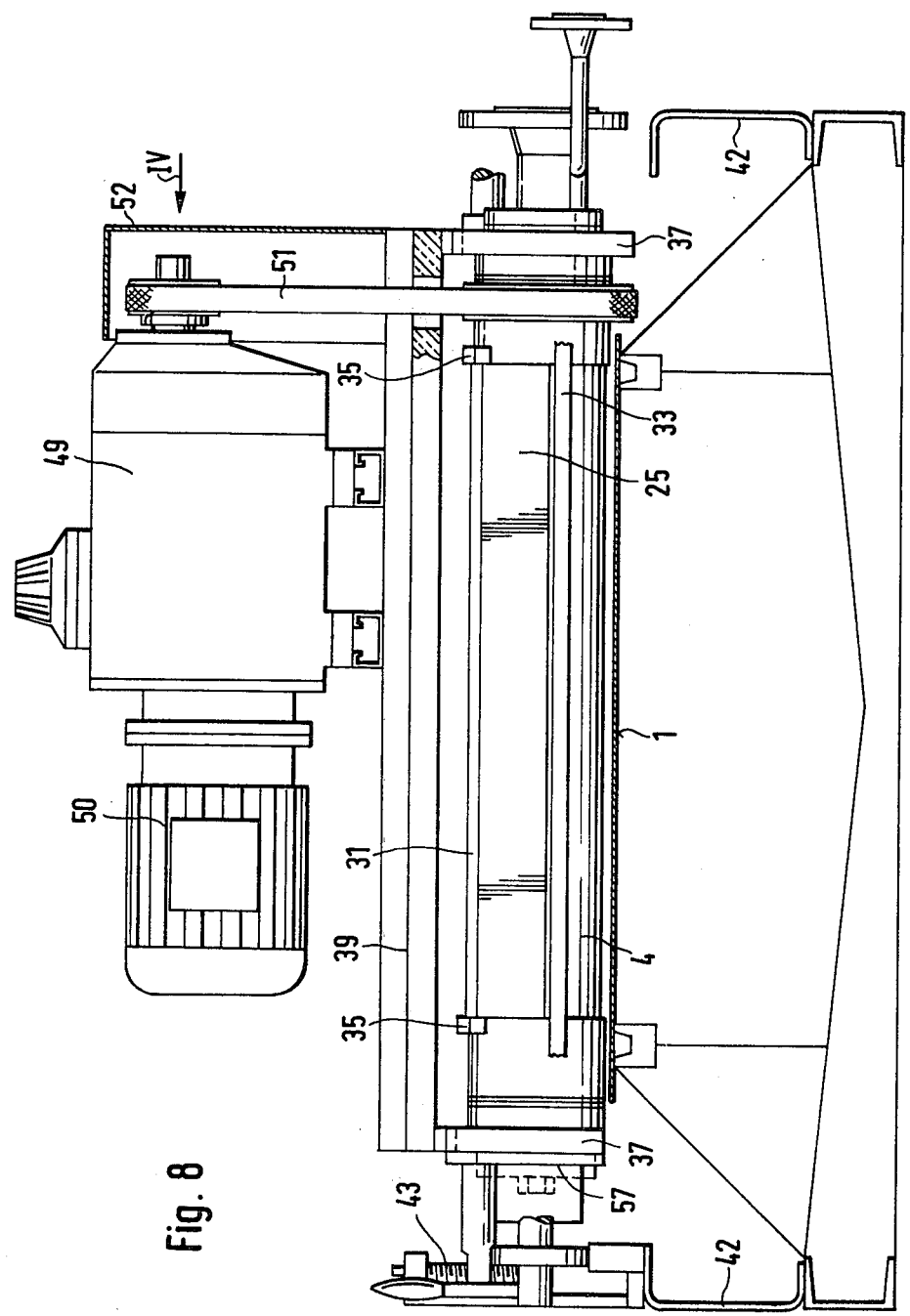
Figure 9:
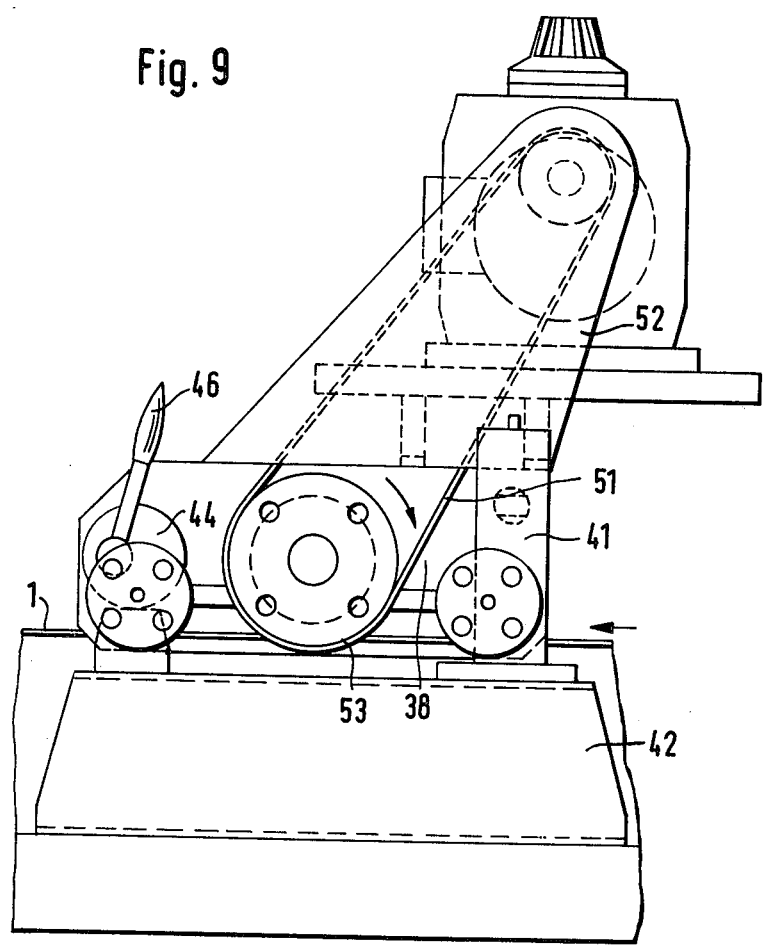

FIGS. 8 to 10 show the two drums 3 and 4 (one drum placed inside the other and only the outer drum 4 being visible in the drawing) arranged above the conveyor or cooling belt which in the case of the embodiment illustrated therein, is designed in the form of a steel belt 1. This is accomplished by providing the two ends of the outer drum 4 with support bearings 37 which in turn are held by the supporting plates 38. The supporting plates 38 are connected with each other by cross-braces 39 and are held by two supporting bars 40 which run laterally across the belt 1. One of the supporting bars 40 is secured at its ends in bearings 41 which are mounted on U-shaped supporting beams 42. FIGS. 8 and 9 show that the bearings 41 are designed so that the supporting bar 40 is fixedly held relative to the direction of belt motion but can be adjusted vertically by means of screw spindles 43 in the bearings so that it is possible to change and set the distance between the perimeter of the outer drum 4 and the top of the steel belt 1.

The second supporting bar 40 is not placed in bearings 41 which can be adjusted vertically by means of spindles 43, but has its ends mounted-in with eccentrics 44 which rest on corresponding bearing surfaces 45. The eccentrics 44, are swivel-mounted in the supporting plates 38 and can be turned by means of the hand lever 46 so that their height is adjustable, thus making possible a change in the distance between drum 4 and the belt 1.

The cross-braces 39 which connect the lateral supporting plates 38 with each other, carry supporting sections 48 which extend in direction of the belt motion 47 and which hold in place a gearing 49, this gearing being driven by a motor 50. The gearing 49 is connected by means of a belt 51, placed under a covering 52, with a drive pinion 53 which is fixedly attached to the outer drum 4. This arrangement makes it possible to rotate the outer drum 4 by means of the motor 50.

The material to be granulated is introduced into the interior of the inner stationary drum (not visible) by a feed pipeline 54 at the top of the drum, with the material usually being heated to such degree that it becomes flowable and capable of forming drops. The inner, stationary drum is, for this purpose, provided with heating devices, similar to the types illustrated in FIGS. 1 to 5, with the heating medium conducted into the interior of the drum 3 by way of a pipeline 55 and removed from there by way of a discharge pipeline 56. The heating can be accomplished either by means of tubes which are arranged within the stationary drum (see FIGS. 1 to 3) or by providing the stationary drum with double walls (see FIG. 4) and by charging with heating medium the area formed by the double walls. The inner drum is fixedly connected with one of the supporting plates 38. The inner drum is fixedly connected with one of the supporting plates 38. For the purpose of disassembly, the inner drum can be pulled from the outer drum 4 at its front end after the disconnection of a bolted front plate 57.

An apparatus for the extrusion and granulation of flowable masses according to the present invention can be built in a very simple manner. This novel design makes feasible the construction of an apparatus without the use and need of reciprocating components, such as plungers or pistons, thus making it possible to eliminate the friction and the resulting wear and tear of the rotating parts which does occur in the case of the known arrangements.

It is feasible to arrange the outer drum in such manner that it is stationary and to provide the same with a row of apertures which face the conveyor belt, while the second drum, carrying a multitude of apertures, rotates inside the outer drum.

Although the invention has been described in connection with a preferred embodiment thereof, it will be appreciated by those skilled in the art that additions, deletions, substitutions and modifications not specifically described may be made without departing from the spirit and scope of the invention as defined in the appended claims.

What is claimed is:

1. Apparatus for the extrusion of a flowable mass onto a moving conveyor comprising:
   a first cylindrical container disposed above the conveyor for rotation about a longitudinal axis,
      said first container including a plurality of first passages through the container periphery,
   a second cylindrical container including means for longitudinally admitting into said second container the mass to be extruded and having a wall portion containing a plurality of second passages directed toward the conveyor and radially alignable with said first passages, said wall portion disposed at least closely adjacent said first container,
   said first container being mounted for continuous 360° rotation about the longitudinal axis thereof relative to said second container such that relative rotation between said containers produces sequential misalignment and alignment of the first and second passages to enable the flowable mass to travel radially outwardly through the aligned passages and onto the conveyor, and
   a spatula for removing excess mass from the perimeter of said first container, said spatula being directed toward said first container generally in the direction of rotation thereof, said spatula being tightly pressed against the perimeter of said first container in the region of said first passages to scrape excess mass into said first passages.

2. Apparatus according to claim 1, wherein circumferentially staggered ones of said first passages are interconnected by grooves disposed along the periphery of the first container.

3. Apparatus according to claim 2, wherein each said groove extends in a spiral direction, each groove interconnecting apertures which lie in parallel planes that are disposed perpendicularly to the container axis and which lie on different longitudinal imaginary lines extending along the periphery of said first container.

4. Apparatus for extruding drops of a flowable mass onto a conveyor, said apparatus comprising:
   a first cylindrical container comprising a plurality of first passages,
   a second cylindrical container disposed within said first container and including a plurality of second passages,
   means for admitting flowable material into said second container,
   means for producing relative rotation between said containers to periodically align said first and second passages to deposit drops of the flowable material through the passages and onto the conveyor,
   said first and second containers being mounted to separate radially from one another during said relative rotation so as to form a negatively pressurized gap therebetween at a location opposite the location where the passages are periodically aligned, to suck-in excessive mass into said passages of said first container.

5. Apparatus according to claim 4, wherein said gap being formed by a recess in the periphery of said second container, the outer diameter of said recess being less than the inner diameter of said first container.

6. Apparatus according to claim 5, including a spatula contacting the periphery of said first container to push excess material back into said first passages, said spatula being disposed in the region of said gap.

7. Apparatus according to claim 6, including a cover fitting tightly around the periphery of said first container to cover the sector formed by said gap.

8. Apparatus according to claim 7, wherein said cover is bordered at its longitudinal ends by curved guiding webs having a contour corresponding to that of the first container.

9. Apparatus according to claim 8, wherein said guiding webs include front ends which are beveled longitudinally inwardly to direct excess material to said spatula.

10. Apparatus according to claim 4, wherein said first container rotates.

* * * * *